(12) United States Patent
Ueno

(10) Patent No.: US 11,345,128 B2
(45) Date of Patent: May 31, 2022

(54) DECORATIVE SHEET AND DECORATIVE MATERIAL USING SAME

(71) Applicant: Dai Nippon Printing Co., Ltd., Tokyo (JP)

(72) Inventor: Masanori Ueno, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 51 days.

(21) Appl. No.: 17/040,683

(22) PCT Filed: Mar. 29, 2019

(86) PCT No.: PCT/JP2019/014089
§ 371 (c)(1),
(2) Date: Oct. 23, 2020

(87) PCT Pub. No.: WO2019/189797
PCT Pub. Date: Oct. 3, 2019

(65) Prior Publication Data
US 2021/0053326 A1    Feb. 25, 2021

(30) Foreign Application Priority Data

Mar. 29, 2018  (JP) .............. JP2018-065952

(51) Int. Cl.
*B32B 27/20* (2006.01)
*B32B 27/16* (2006.01)

(52) U.S. Cl.
CPC .............. *B32B 27/20* (2013.01); *B32B 27/16* (2013.01); *B32B 2250/02* (2013.01);
(Continued)

(58) Field of Classification Search
CPC ....... B32B 13/042; B32B 13/08; B32B 13/12; B32B 17/10; B32B 2250/02;
(Continued)

(56) References Cited

U.S. PATENT DOCUMENTS

2013/0209819 A1    8/2013   Noda et al.

FOREIGN PATENT DOCUMENTS

CN          101031418 A     9/2007
CN          103167955 A     6/2013
(Continued)

OTHER PUBLICATIONS

International Search Report dated Jun. 18, 2019, issued for PCT/JP2019/014089.
(Continued)

*Primary Examiner* — Lawrence D Ferguson
(74) *Attorney, Agent, or Firm* — Locke Lord LLP

(57) ABSTRACT

There are provided a decorative sheet which has excellent weatherability and in which white pigment particles are dispersed well, and a decorative material using the decorative sheet. The decorative sheet includes at least a substrate and a surface protective layer. The surface protective layer contains an ultraviolet absorber, and the substrate contains white pigment particles. The white pigment particles are titanium oxide particles having a coating containing Al element and Si element and formed on part or the whole of their surfaces, and contain Ti, Al and Si elements in the following mass ratio: when Ti is taken as 1, Al is not less than 0.02 and less than 0.20, and Si is more than 0.002 and not more than 0.070.

8 Claims, 1 Drawing Sheet

(52) U.S. Cl.
CPC ... *B32B 2250/03* (2013.01); *B32B 2264/1022* (2020.08); *B32B 2264/401* (2020.08); *B32B 2264/403* (2020.08); *B32B 2307/71* (2013.01); *B32B 2310/0831* (2013.01); *B32B 2451/00* (2013.01)

(58) Field of Classification Search
CPC ............ B32B 2250/03; B32B 2255/10; B32B 2255/20; B32B 2255/26; B32B 2255/28; B32B 2264/102; B32B 2264/1022; B32B 2264/104; B32B 2264/105; B32B 2264/108; B32B 2264/401; B32B 2264/403; B32B 2307/4026; B32B 2307/41; B32B 2307/412; B32B 2307/584; B32B 2307/71; B32B 2307/712; B32B 2307/732; B32B 2307/75; B32B 2310/0831; B32B 2451/00; B32B 27/08; B32B 27/16; B32B 27/20; B32B 27/32; B32B 7/12; B44C 1/105; E04F 13/0866
See application file for complete search history.

(56) References Cited

FOREIGN PATENT DOCUMENTS

| | | |
|---|---|---|
| JP | 2004-277516 A | 10/2004 |
| JP | 2005-335336 A | 12/2005 |
| JP | 2011-075931 A | 4/2011 |
| JP | 2012-212050 A | 11/2012 |
| JP | 2014-88026 A | 5/2014 |
| JP | 5821461 B2 | 11/2015 |
| JP | 2016-168785 A | 9/2016 |
| JP | 2016-168787 A | 9/2016 |
| JP | 2017-202674 A | 11/2017 |

OTHER PUBLICATIONS

DuPont&Trade, "Ti-Pure titanium dioxide Titanium Dioxide for Coatings," Jan. 1, 2007, The miracles of science, pp. 1-28. (cited in the Nov. 15, 2021 Search Report issued for EP19778348.3).
Supplementary European Search Report dated Nov. 15, 2021, issued for European Patent Application No. 19778348.3.
Office Action dated Apr. 14, 2022, issued for Chinese Patent Application No. 201980035537.2.

DECORATIVE SHEET AND DECORATIVE MATERIAL USING SAME

TECHNICAL FIELD

The present invention relates to a decorative sheet and to a decorative material using the sheet.

BACKGROUND ART

A laminate consisting of an adherend, which is a metal member such as a steel plate, a resin member or a wood member, and a decorative sheet attached to the adherend is generally used for an interior material or an exterior member of an architectural structure such as a wall, a ceiling, a floor, or a front door; fittings or a fixture member such as a window frame, a door, a handrail, a skirting board, a crown molding, or a cable cover; a surface decorative plate for a kitchen or furniture or for a cabinet of a light electrical appliance, an OA instrument, etc.; or an interior material or an exterior member of a vehicle. A substrate of the decorative sheet, which is to be used for such a member, is known to contain a white pigment such as titanium oxide ($TiO_2$) from the viewpoint of the design.

Titanium oxide exhibits a strong oxidizing power upon its photoexcitation. When a decorative sheet containing titanium oxide is used for an exterior member, the photocatalytic action of the titanium oxide can cause decomposition or a chemical reaction of a resin contained in the substrate of the decorative sheet, which will result in degradation of the resin or delamination in the decorative sheet, leading to a decrease in the weatherability.

In this regard, a method is known which, in view of the fact that light that induces the photocatalytic action of titanium oxide includes ultraviolet light having a wavelength of not more than 380 nm, adds an ultraviolet absorber to a surface protective layer of a decorative sheet, which is to be exposed to light, thereby inhibiting the photocatalytic action of titanium oxide caused by ultraviolet light (see, for example, PTLs 1 and 2). A method is also known which involves the use of white pigment particles, composed of titanium oxide, whose surfaces are treated e.g. with an inorganic metal oxide in order to inhibit the photocatalytic action of the titanium oxide.

CITATION LIST

Patent Literature

PTL 1: JP 2016-168785A
PTL 2: JP 2016-168787A

SUMMARY OF INVENTION

Technical Problem

However, most of practical ultraviolet absorbers have an absorption wavelength range which includes the range from 380 nm to a visible light range. This is because the wavelength 380 nm is near the boundary wavelength between visible light and ultraviolet light. Therefore, when the content of an ultraviolet absorber in a surface protective layer of a decorative sheet is increased in order to prevent delamination over time and enhance the ultraviolet absorption capacity, the surface protective layer will also absorb violet to blue light, belonging to the short-wavelength range of visible light. This may cause yellowing of the surface protective layer and thus deteriorate the design of the decorative sheet. Furthermore, the ultraviolet absorber may bleed from the surface protective layer and cause contamination or a change in the appearance, such as the gloss, of the surface of the decorative sheet. In addition, the decrease in the concentration of the ultraviolet absorber in the decorative sheet will result in a decrease in the weatherability.

The above-described white pigment particles of titanium oxide, having a coating on their surfaces formed by surface treatment, are sometimes poorly dispersed in a resin depending on the nature of the coating. This will result in a decorative sheet which cannot fully exert the effect of the ultraviolet absorber and thus has poor weatherability.

A method is also known which involves using carbon black or the like in a decorative sheet to absorb light having a wavelength that causes photoexcitation of titanium oxide, thereby inhibiting the photocatalytic action of titanium oxide. However, this method places a limitation on the design of the decorative sheet, and therefore is unfavorable.

It is therefore an object of the present invention to provide a decorative sheet which has excellent weatherability and in which white pigment particles are dispersed well, and to provide a decorative material using the decorative sheet.

Solution to Problem

The present inventors, through intensive studies, have found that the above object can be achieved by the present invention which may be embodied as follows:

[1] A decorative sheet including at least a substrate and a surface protective layer, wherein the surface protective layer contains an ultraviolet absorber, and the substrate contains white pigment particles, and wherein the white pigment particles are titanium oxide particles having a coating containing Al element and Si element and formed on part or the whole of their surfaces, and contain Ti, Al and Si elements in the following mass ratio: when Ti is taken as 1, Al is not less than 0.02 and less than 0.20, and Si is more than 0.002 and not more than 0.070.

[2] The decorative sheet as described in [1] above, wherein the substrate further contains a hindered amine light stabilizer.

[3] The decorative sheet as described in [1] or [2] above, wherein the ultraviolet absorber is a triazine ultraviolet absorber.

[4] The decorative sheet as described in any one of [1] to [3] above, wherein the surface protective layer contains a cured product of an ionizing radiation-curable resin composition.

[5] The decorative sheet as described in any one of [1] to [4] above, wherein the value [(a×b)/100], obtained by dividing by 100 the product of the content a [% by mass] of the white pigment particles in the substrate and the thickness b [μm] of the substrate, is not less than 0.1 and not more than 20.

[6] The decorative sheet as described in any one of [1] to [5] above, further including a backing substrate, wherein the backing substrate, the substrate and the surface protective layer are disposed in this order.

[7] The decorative sheet as described in any one of [1] to [6] above, further including a decorative layer between the substrate and the surface protective layer.

[8] A decorative material including an adherend and the decorative sheet as described in any one of [1] to [7] above.

Advantageous Effects of Invention

According to the present invention, it is possible to provide a decorative sheet which has excellent weatherability and in which white pigment particles are dispersed well, and to provide a decorative material using the decorative sheet.

DESCRIPTION OF EMBODIMENTS

<Decorative Sheet>

Figure 1:
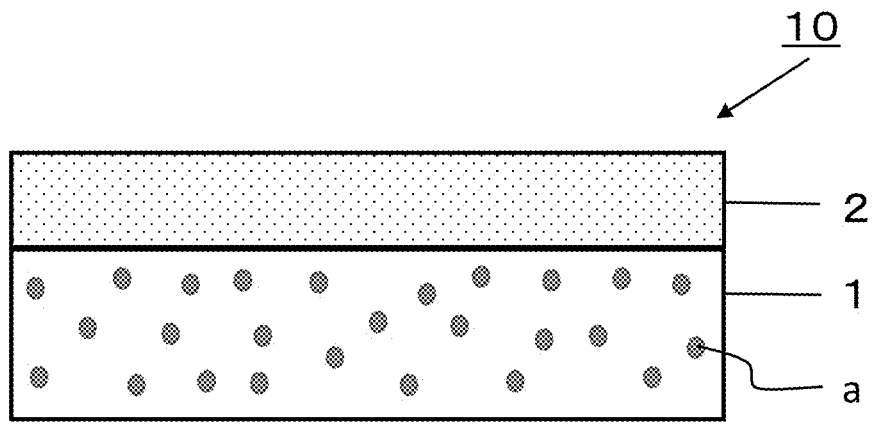
FIG. 1 is a schematic cross-sectional view illustrating an embodiment of a decorative sheet according to the present invention.

The decorative sheet of the present invention includes at least a substrate and a surface protective layer. The surface protective layer contains an ultraviolet absorber, and the substrate contains white pigment particles.

The white pigment particles are titanium oxide particles having a coating containing Al element and Si element and formed on part or the whole of their surfaces, and contain Ti, Al and Si elements in a particular mass ratio.

In the decorative sheet of the present invention, the substrate contains the white pigment particles which contain Ti, Al and Si elements in a particular mass ratio. Such white pigment particles can be well dispersed in the substrate. Further, the coating of the surfaces of the titanium oxide particles can inhibit the photocatalytic action of the titanium oxide, and can therefore achieve excellent weatherability.

The weatherability of the decorative sheet of the present invention can be enhanced by the ultraviolet absorber contained in the surface protective layer, while the use of the white pigment particles can achieve excellent weatherability as described above. This can avoid the use of a large amount of the ultraviolet absorber, thereby avoiding yellowing of the decorative sheet.

Further, unlike the case of inhibiting the photocatalytic action of titanium oxide by the use of carbon black or the like, the decorative sheet of the present invention is free from a limitation on the color of the sheet, and thus is excellent in the design of the sheet.

[Substrate]
(White Pigment Particles)

The white pigment particles for use in the present invention are titanium oxide particles having a coating containing Al element and Si element and formed on part or the whole of their surfaces. The white pigment particles contain Ti, Al and Si elements in the following mass ratio (conditions):
<Conditions> when Ti is taken as 1, Al is not less than 0.02 and less than 0.20, and Si is more than 0.002 and not more than 0.070.

If the mass ratio of Al falls out of the above range, dispersion of the white pigment particles in the substrate may be poor, causing uneven coloring of the substrate. If the dispersion of the white pigment particles is poor, in a case where a light stabilizer is contained in the substrate, the concentration of the light stabilizer, when used in the substrate, may be low locally. This may result in failure to achieve excellent weatherability and, in addition, can cause delamination. If the mass ratio of Si falls out of the above range, the decorative sheet may have poor weatherability.

The mass ratio of Al is preferably not less than 0.025, more preferably not less than 0.03 from the viewpoint of dispersion of the white pigment particles. The mass ratio of Al is preferably not more than 0.16, more preferably not more than 0.12.

The mass ratio of Si is preferably not less than 0.003, more preferably not less than 0.004 from the viewpoint of weatherability. The mass ratio of Si is preferably not more than 0.060, more preferably not more than 0.040.

Titanium oxide can be classified into the anatase type, the brookite type and the rutile type. Titanium oxide of the rutile type is preferably used as the white pigment particles from the viewpoint of the masking properties of the white pigment and the weatherability.

The white pigment particles, which are titanium oxide particles having a coating containing Al element and Si element and formed on part or the whole of their surfaces, can be obtained by subjecting the titanium oxide particles to surface treatment with an inorganic metal oxide containing at least Al element and Si element.

Alumina and silica, for example, can be used as the inorganic metal oxide. The coating formed on the surfaces of the titanium oxide particles may contain an element(s) other than Al and Si. Zirconia, tin oxide, antimony oxide, zinc oxide, etc. can be used as an inorganic metal oxide containing an element other than Al and Si.

The value [(a×b)/100], obtained by dividing by 100 the product of the content a [% by mass] of the white pigment particles in the substrate and the thickness b [μm] of the substrate, is preferably not less than 0.1, more preferably not less than 2.0, and even more preferably not less than 5.0. The value [(a×b)/100] is preferably not more than 20.0, more preferably not more than 15.0, and even preferably not more than 10.0. With regard to the concentration of the white pigment particles in the substrate, the value [(a×b)/100] is preferably within the above range in order for the decorative sheet to achieve excellent weatherability.

The average particle diameter of the primary particles of the white pigment particles is preferably not less than 0.02 μm and not more than 1.5 μm, more preferably not less than 0.15 μm and not more than 0.5 μm, and even preferably not less than 0.1 μm and not more than 0.3 μm. When the average particle diameter of the white pigment particles is within the above range, it is possible to provide a decorative sheet which is excellent in the dispersion of the white pigment particles and in the weatherability, and which has high masking properties and good design.

The average particle diameter herein refers to a value that can be determined as a mass average value D50 in the measurement of particle size distribution by a laser diffraction method.

The substrate may be either a coated film obtained by applying a paint containing the white pigment particles to a film, or a film produced by molding of a resin composition containing the white pigment particles.

When the substrate is a coated film obtained by applying a paint containing the white pigment particles to a film, there is no particular limitation on a binder resin for use in the paint. Examples of usable binder resins include a polyurethane resin, a vinyl chloride-vinyl acetate copolymer resin, a vinyl chloride-vinyl acetate-acrylate copolymer resin, a chlorinated propylene resin, an acrylic resin, a polyester resin, a polyamide resin, a butyral resin, a polystyrene resin, a nitrocellulose resin, and a cellulose acetate resin. These binder resins can be used singly or in a combination of two or more.

The substrate may be composed of a single layer of the above resin, or two or more layers of the same resin or different resins. When the substrate is the above-described coated film, the decorative sheet preferably includes the below-described backing substrate.

When the substrate is a film produced by molding of a resin composition containing the white pigment particles, a thermoplastic resin may be used in the composition. Examples of the thermoplastic resin include a polyolefin resin such as polypropylene or polyethylene, a polyester resin, a polycarbonate resin, an acrylonitrile-butadiene-styrene resin (hereinafter also referred to as an "ABS resin"), an acrylic resin, and a vinyl chloride resin. Among them, in view of the processing characteristics, a polyolefin resin, a polyester resin, a polycarbonate resin, a vinyl chloride resin, and an ABS resin are preferred, and a polyolefin resin is especially preferred. In the present invention, these resins can be used singly or in a combination of two or more.

The substrate may be composed of a single layer of the above resin, or two or more layers of the same resin or different resins.

The substrate may be a colored substrate additionally containing a colorant other than the white pigment particles. Examples of the colorant include an inorganic pigment such as carbon black, iron black, chrome yellow, titanium yellow, red iron oxide, cadmium red, ultramarine blue, or cobalt blue; an organic pigment or dye such as quinacridone red, isoindolinone yellow, or phthalocyanine blue; a metal pigment such as scaly foil pieces of aluminum, brass, or the like; and an pearlescent (pearl) pigment such as scaly foil pieces of titanium dioxide-coated mica, basic lead carbonate, or the like.

There is no particular limitation on the manner of coloring the substrate; either transparent coloring or opaque coloring may be employed.

The substrate may optionally contain an additive. Examples of the additive include an inorganic filler such as calcium carbonate or clay, a flame retardant such as magnesium hydroxide, an antioxidant, a lubricant, a foaming agent, a light stabilizer, and an ultraviolet absorber. Among them, from the viewpoint of weatherability, a light stabilizer and an ultraviolet absorber are preferred, and a light stabilizer is more preferred. These additives may be used singly or in a combination of two or more.

(Light Stabilizer)

A hindered amine light stabilizer or a compound thereof is preferably used as the light stabilizer. A high-molecular weight hindered amine compound, which is less likely to bleed out, can also be used. The high-molecular weight hindered amine compound may be a copolymer with ethylene or another monomer (e.g. an ethylene-cyclic aminovinyl compound copolymer), or a graft copolymer of a polymer such as polyethylene. The substrate may contain a hindered amine light stabilizer in addition to such a high-molecular weight hindered amine compound, for example, an ethylene-cyclic aminovinyl compound copolymer.

Examples of usable light stabilizers include 4-benzoyloxy-2,2,6,6-tetramethyl piperidine, 1,2,2,6,6-pentamethyl-4-piperidinyl (meth)acrylate, bis(2,2,6,6-tetramethyl-4-piperidyl) sebacate, bis(1,2,2,6,6-pentamethyl-4-piperidyl) sebacate, bis(1-octyloxy-2,2,6,6-tetramethyl-4-piperidinyl) sebacate, bis(1,2,2,6,6-pentamethyl-4-piperidinyl) sebacate, methyl(1,2,2,6,6-pentamethyl-4-piperidinyl) sebacate, 2,4-bis[N-butyl-N-(1-cyclohexyloxy-2,2,6,6-tetramethyl-4-piperidinyl)amino]-6-(2-hydroxyethylamine)-1,3,5-triazine), tetrakis(1,2,2,6,6-pentamethyl-4-piperidyl)-1,2,3,4-butanetetracarboxylate, bis(1-undecanoxy-2,2,6,6-tetramethyl piperidine-4-yl) carbonate, bis(1,2,2,6,6-pentamethyl-4-piperidyl)-2-(3,5-di-t-butyl-4-hydroxybenzyl)-2-n-butyl malonate, bis(1,2,2,6,6-pentamethyl-4-piperidyl)-2-butyl-2-(3,5-ditert-butyl-4-hydroxybenzyl) malonate, tetra(2,2,6,6-tetramethyl-4-piperidinyl) butane tetracarboxylate, tetra(1,2,2,6,6-pentamethyl-4-piperidyl) butane tetracarboxylate, bis(2,2,6,6-tetramethyl-4-piperidyl)-di(tridecyl) butane tetracarboxylate, bis(1,2,2,6,6-pentamethyl-4-piperidyl)-di(tridecyl) butane tetracarboxylate, 3,9-bis[1,1-dimethyl-2-{tris (2,2,6,6-tetramethyl-4-piperidyloxycarbonyloxy) butylcarbonyloxy}ethyl]-2,4,8,10-tetraoxaspiro[5,5]undecane, 3,9-bis[1,1-dimethyl-2-{tris(1,2,2,6,6-pentamethyl-4-piperidyloxycarbonyloxy) butylcarbonyloxy}ethyl]-2,4,8,10-tetraoxaspiro[5,5]undecane, 1,5,8,12-tetrakis[4,6-bis{N-(2,2,6,6-tetramethyl-4-piperidyl) butylamino}-1,3,5-triazine-2-yl]-1,5,8,12-tetraazadodecane, the condensation product of 1-(2-hydroxyethyl)-2,2,6,6-tetramethyl-4-piperidinol and dimethyl succinate, the condensation product of 2-tertoctylamino-4,6-dichloro-s-triazine and N,N'-bis(2,2,6,6-tetramethyl-4-piperidyl) hexamethylenediamine, and the condensation product of N,N'-bis(2,2,6,6-tetramethyl-4-piperidyl) hexamethylenediamine and dibromoethane.

These light stabilizers and their compounds may be used singly or in a combination or two or more.

Among them, a hindered amine compound having at least two piperidine rings in its molecule and having a molecular weight of not less than 500 can be preferably used. If the number of piperidine rings in the molecule is less than 2, it may be difficult to obtain sufficient weatherability. If the molecular weight is less than 500, the hindered amine compound is volatile. It may, therefore, be difficult to obtain long-term weatherability.

The content of the light stabilizer in the substrate is preferably not less than 0.1 parts by mass, more preferably not less than 1 part by mass, even more preferably not less than 3 parts by mass based on 100 parts by mass of the resin constituting the substrate. On the other hand, the content of the light stabilizer in the substrate is preferably not more than 10 parts by mass, more preferably not more than 8 parts by mass, even more preferably not more than 6 parts by mass based on 100 parts by mass of the resin constituting the substrate. When the content of the light stabilizer is within the above range, it is unlikely to bleed out and can achieve superior weatherability.

When the substrate is a coated film, the thickness of the coated film is preferably not less than 0.5 μm, more preferably not less than 1 μm, and even more preferably not less than 3 μm from a design viewpoint. The thickness of the coated film is preferably not more than 30 μm, more preferably not more than 20 μm, and even more preferably not less than 10 μm.

When the substrate is a molded film, the thickness of the molded film is preferably not less than 40 μm, more preferably not less than 50 μm, and even more preferably not less than 60 μm from the viewpoint of enhancing the weatherability, and also enhancing the processing characteristics and the scratch resistance. The thickness of the molded film is preferably not more than 200 μm, more preferably not more than 150 μm, and even more preferably not less than 100 μm.

[Surface Protective Layer]

The surface protective layer preferably contains a cured product of a curable resin composition. While the cured product may be a cured product of a thermosetting resin composition, it is preferably a cured product of an ionizing radiation-curable resin composition from the viewpoint of excellent weatherability and of enhancing the surface characteristics such as scratch resistance.

The ionizing radiation-curable resin is a resin which is capable of being crosslinked and cured upon irradiation with ionizing radiation and which has an ionizing radiation-curable functional group. The ionizing radiation-curable functional group herein refers to a group capable of being crosslinked and cured upon irradiation with ionizing radiation. A functional group having an ethylenic double bond, such as a (meth)acryloyl group, a vinyl group or an allyl group, is an exemplary preferable ionizing radiation-curable functional group. The ionizing radiation refers to electromagnetic radiation or charged particle radiation having an energy quantum that can polymerize or crosslink molecules. While ultraviolet (UV) radiation or electron beam (EB) radiation is generally used, electromagnetic radiation, such as an X-ray radiation or γ-ray radiation, or charged particle radiation, such as an α-ray radiation or ion beam radiation, may also be used.

A specific ionizing radiation-curable resin to be used can be appropriately selected from among polymerizable monomers and polymerizable oligomers which are conventionally used as ionizing radiation-curable resins.

A (meth)acrylate monomer having a radical-polymerizable unsaturated group in the molecule, in particular a polyfunctional (meth)acrylate monomer, is preferably used as a polymerizable monomer. As used herein, "(meth)acrylate" refers to "acrylate or methacrylate".

The polyfunctional (meth)acrylate monomer can be exemplified by a (meth)acrylate monomer having 2 or more ionizing radiation-curable functional groups in the molecule and having at least a (meth)acryloyl group as the functional group.

From the viewpoint of enhancing the weatherability and the scratch resistance, and also enhancing the processing characteristics, the number of the functional groups is preferably not less than 2 and not more than 8, more preferably not less than 2 and not more than 6, even more preferably not less than 2 and not more than 4, and especially preferably not less than 2 and not more than 3. These polyfunctional (meth)acrylate monomers may be used singly or in a combination of two or more.

The polymerizable oligomer can be exemplified by a (meth)acrylate oligomer having 2 or more ionizing radiation-curable functional groups in the molecule and having at least a (meth)acryloyl group as the functional group. Examples of the (meth)acrylate oligomer include a urethane (meth)acrylate oligomer, an epoxy (meth)acrylate oligomer, a polyester (meth)acrylate oligomer, a polyether (meth) acrylate oligomer, a polycarbonate (meth)acrylate oligomer, and an acrylic (meth)acrylate oligomer.

Examples of the polymerizable oligomer further include a highly hydrophobic polybutadiene (meth)acrylate oligomer having a (meth)acrylate group in a side chain of a polybutadiene oligomer, a silicone (meth)acrylate oligomer having a polysiloxane bond in the main chain; an aminoplast resin (meth)acrylate oligomer obtained by modifying an aminoplast resin having a number of reactive groups in the small molecule, and an oligomer having a cation-polymerizable functional group in the molecule such as a novolak epoxy resin, a bisphenol epoxy resin, an aliphatic vinyl ether, an aromatic vinyl ether, or the like.

These polymerizable oligomers may be used singly or in a combination of two or more. From the viewpoint of enhancing the weatherability and the scratch resistance, and also enhancing the processing characteristics, a urethane (meth)acrylate oligomer, an epoxy (meth)acrylate oligomer, a polyester (meth)acrylate oligomer, a polyether (meth) acrylate oligomer, a polycarbonate (meth)acrylate oligomer, and an acrylic (met)acrylate oligomer are preferred, and a urethane (meth)acrylate oligomer and a polycarbonate (meth)acrylate oligomer are more preferred, and a urethane (meth)acrylate oligomer is even more preferred.

From the viewpoint of enhancing the weatherability and the scratch resistance, and also enhancing the processing characteristics, the number of functional groups of each of the polymerizable oligomers is preferably not less than 2 and not more than 8. The upper limit is preferably 6 or less, more preferably 4 or less, especially preferably 3 or less. The weight-average molecular weight of each of the polymerizable oligomers is preferably not less than 2,500 and not more than 7,500, more preferably not less than 3,000 and not more than 7,000, and even more preferably not less than 3,500 and not more than 6,000. The weight-average molecular weight herein refers to an average molecular weight which is measured by GPC analysis and calculated in terms of standard polystyrene. The use of a polymerizable oligomer, having the above-described weight-average molecular weight and number of functional groups, in the present invention can prevent bleeding of an ultraviolet absorber not only from the surface protective layer but from an intermediate resin layer as well, thus achieving superior weatherability. Furthermore, the surface protective layer can have an appropriate hardness, and can therefore enhance the scratch resistance and the processing characteristics.

In the present invention, in order to reduce the viscosity of the ionizing radiation-curable resin, a monofunctional (meth)acrylate can be appropriately used together with the above-described polyfunctional (meth)acrylate as long as the intended effect of the present invention is not impaired. In that case, either a single monofunctional (meth)acrylate or a combination of two or more monofunctional (meth)acrylates may be used.

In the present invention, the ionizing radiation-curable resin preferably contains the polymerizable oligomer from the viewpoint of enhancing the weatherability and the scratch resistance, and also enhancing the processing characteristics. The content of the polymerizable oligomer in the ionizing radiation-curable resin is preferably not less than 80% by mass, more preferably not less than 90% by mass, even more preferably not less than 95% by mass, and especially preferably 100% by mass.

(Ultraviolet Absorber)

The ultraviolet absorber for use in the surface protective layer can be exemplified by a triazine ultraviolet absorber, a cyanoacrylate ultraviolet absorber, a benzotriazole ultraviolet absorber, and a benzophenone ultraviolet absorber. Among them, a triazine ultraviolet absorber is preferred from the viewpoint of little discoloration upon irradiation with the above-described ionizing radiation. Either a single ultraviolet absorber or a combination of two or more ultraviolet absorbers may be used.

Among triazine ultraviolet absorbers, a hydroxyphenyl triazine ultraviolet absorber in which three organic groups, selected from a hydroxyphenyl group, an alkoxyphenyl group, and an organic group containing one of these groups, are connected to the triazine ring is more preferred, and a hydroxyphenyl triazine ultraviolet absorber represented by the following general formula (1) is even more preferred. Since the surface protective layer is located at the outermost surface of the decorative sheet, an ultraviolet absorber which hardly bleeds from the layer is preferred. The hydroxyphenyl triazine ultraviolet absorber represented by the following general formula (1) has a branched structure, and therefore it is expected to hardly bleed out. Thus, from the viewpoint of the weathering performance, it is especially preferred as an ultraviolet absorber for use in the surface protective layer.

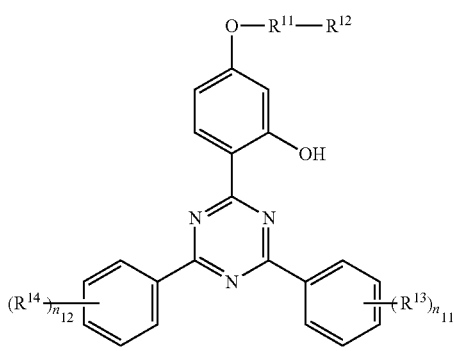
(1)

In the general formula (1), $R^{11}$ is a divalent organic group; $R^{12}$ is an ester group represented by —C(=O)O$R^{15}$; $R^{13}$, $R^{14}$ and $R^{15}$ are each independently a monovalent organic group; and $n_{11}$ and $n_{12}$ are each independently an integer of 1 to 5.

The divalent organic group $R^{11}$ can be exemplified by an aliphatic hydrocarbon group such as an alkylene group or an alkenylene group and, from the viewpoint of weatherability, an alkylene group is preferred. The number of carbon atoms is preferably not less than 1, and the upper limit is preferably 20 or less, more preferably 12 or less, even more preferably 8 or less, and especially preferably 4 or less. The alkylene group and the alkenylene group may each be linear, branched, or cyclic, preferably linear or branched.

Examples of the alkylene group having 1 to 20 carbon atoms include a methylene group, a 1,1-ethylene group, a 1,2-ethylene group, various propylene groups such as 1,3-propylene, 1,2-propylene, and 2,2-propylene (as used herein, the term "various" includes linear and branched groups, and isomers thereof), various butylene groups, various pentylene groups, various hexylene groups, various heptylene groups, various octylene groups, various nonylene groups, various decylene groups, various undecylene groups, various dodecylene groups, various tridecylene groups, various tetradecylene groups, various pentadecylene groups, various hexadecylene groups, various heptadecylene groups, various octadecylene groups, various nonadecylene groups, and various eicosylene groups.

The monovalent organic groups $R^{13}$ and $R^{14}$ can be exemplified by an alkyl group, an alkenyl group, a cycloalkyl group, an aryl group, and an arylalkyl group. An aromatic hydrocarbon group such as an aryl group or an arylalkyl group is preferred, and an aryl group is more preferred. A phenyl group is especially preferred as the monovalent organic group $R^{13}$, $R^{14}$.

The number of carbon atoms of the aryl group is preferably not less than 6, and the upper limit is preferably 20 or less, more preferably 12 or less, and even more preferably 10 or less. Examples of the aryl group include a phenyl group, various methylphenyl groups, various ethylphenyl groups, various dimethylphenyl groups, various propylphenyl groups, various trimethylphenyl groups, various butylphenyl groups, and various naphthyl groups. The number of carbon atoms of the arylalkyl group is preferably not less than 7, and the upper limit is preferably 20 or less, more preferably 12 or less, and even more preferably 10 or less. Examples of the arylalkyl group include a benzyl group, a phenethyl group, various phenylpropyl groups, various phenylbutyl groups, various methylbenzyl groups, various ethylbenzyl groups, various propylbenzyl groups, various butylbenzyl groups, and various hexylbenzyl groups.

The monovalent organic group $R^{15}$ can be exemplified by an alkyl group, an alkenyl group, a cycloalkyl group, an aryl group, and an arylalkyl group. An aliphatic hydrocarbon group such as an alkyl group or an alkenyl group is preferred, and an alkyl group is more preferred. Thus, $R^{12}$ is preferably an alkyl ester group or an alkenyl ester group, and more preferably an alkyl ester group.

The number of carbon atoms of the alkyl group is preferably not less than 1, more preferably not less than 2, and even more preferably not less than 6, and the upper limit is preferably 20 or less, more preferably 16 or less, and even more preferably 12 or less. Examples of the alkyl group include a methyl group, an ethyl group, various propyl groups, various butyl groups, various pentyl groups, various hexyl groups, various octyl groups, various nonyl groups, various decyl groups, various undecyl groups, various dodecyl groups, various tridecyl groups, various tetradecyl groups, various pentadecyl groups, various hexadecyl groups, various heptadecyl groups, various octadecyl groups, various nonadecyl groups, and various eicosyl groups.

The number of carbon atoms of the alkenyl group is preferably not less than 2, more preferably not less than 3, and even more preferably not less than 6, and the upper limit is preferably 20 or less, more preferably 16 or less, and even more preferably 12 or less. Examples of the alkenyl group include a vinyl group, various propenyl groups, various butenyl groups, various pentenyl groups, various hexenyl groups, various octenyl groups, various nonenyl groups, various decenyl groups, various undecenyl groups, various dodecenyl groups, various tridecenyl group, various tetradecenyl groups, various pentadecenyl groups, various hexadecenyl groups, various heptadecenyl groups, various octadecenyl groups, various nonadecenyl groups, and various eicosenyl groups.

Among hydroxyphenyl triazine compounds as represented by the general formula (1), a hydroxyphenyl triazine compound, in which $R^{11}$ is an alkylene group having 1 to 20 carbon atoms, $R^{12}$ is an alkyl ester group in which the alkyl group $R^{15}$ has 1 to 20 carbon atoms, $R^{13}$ and $R^{14}$ are each an aryl group having 6 to 20 carbon atoms, and $n_{11}$ and $n_{12}$ are each 1, is preferred; a hydroxyphenyl triazine compound, in which $R^{11}$ is an alkylene group having 1 to 12 carbon atoms, $R^{12}$ is an alkyl ester group in which the alkyl group $R^{15}$ has 2 to 16 carbon atoms, $R^{13}$ and $R^{14}$ are each an aryl group having 6 to 12 carbon atoms, and $n_{11}$ and $n_{12}$ are each 1, is more preferred; a hydroxyphenyl triazine compound, in which $R^{11}$ is an alkylene group having 1 to 8 carbon atoms, $R^{12}$ is an alkyl ester group in which the alkyl group $R^{15}$ has 6 to 12 carbon atoms, $R^{13}$ and $R^{14}$ are each an aryl group having 6 to 10 carbon atoms, and $n_{11}$ and $n_{12}$ are each 1, is even more preferred; and a hydroxyphenyl triazine compound, in which $R^{11}$ is an alkylene group having 1 to 4 carbon atoms, $R^{12}$ is an alkyl ester group in which the alkyl group $R^{15}$ has 8 carbon atoms, $R^{13}$ and $R^{14}$ are each a phenyl group, and $n_{11}$ and $n_{12}$ are each 1, is especially preferred.

In particular, among hydroxyphenyl triazine compounds as represented by the general formula (1), a hydroxyphenyl triazine compound, in which $R^{11}$ is an ethylene group, $R^{12}$ is an ester group in which $R^{15}$ is an isooctyl group, $R^{13}$ and $R^{14}$ are each a phenyl group, and $n_{11}$ and $n_{12}$ are each 1, namely 2-(2-hydroxy-4-[1-octyloxycarbonylethoxy]phenyl)-4,6-bis(4-phenylphenyl)-1,3,5-triazine, represented by the following chemical formula (2), is preferred. The hydroxyphenyl triazine compound is, for example, available as a commercial product ("TINUVIN 479", manufactured by BASF SE). The triazine ultraviolet absorber may be used singly or in combination of two or more.

(2)

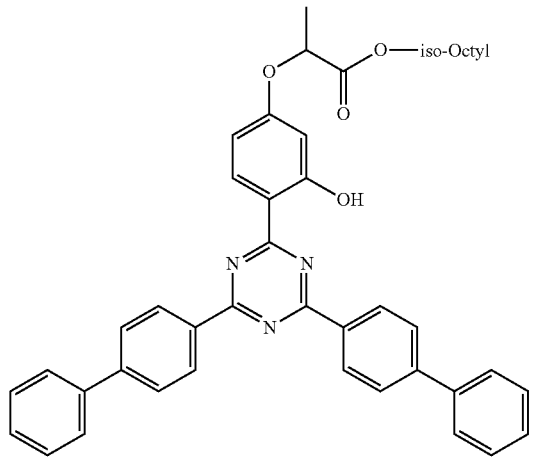

Examples of the cyanoacrylate ultraviolet absorber include 2-ethyl-hexyl-2-cyano-3,3-diphenyl acrylate, ethyl-2-cyano-3,3-diphenyl acrylate, and octyl-2-cyano-3,3-diphenyl acrylate. These compounds may have a functional group such as a vinyl group or an allyl group. These cyanoacrylate ultraviolet absorbers may be used singly or in a combination of two or more.

Examples of the benzotriazole ultraviolet absorber include 2-(2-hydroxy-5-methylphenyl)benzotriazole, 2-(2-hydroxy-3,5-di-tert-amylphenyl)benzotriazole, and 3-[3-(benzotriazole-2-yl)-5-tert-butyl-4-hydroxyphenyl]propionate ester of polyethylene glycol. These compounds may have a functional group such as a (meth)acryloyl group, a vinyl group or an allyl group. These benzotriazole ultraviolet absorbers may be used singly or in a combination of two or more.

Examples of the benzophenone ultraviolet absorber include 2,4-dihydroxybenzophenone, 2-hydroxy-4-methoxybenzophenone, 2-hydroxy-4-octyloxybenzophenone, 2-hydroxy-4-dodecyloxybenzophenone, 2-hydroxy-4-benzyloxybenzophenone, 2-hydroxy-4-(2-hydroxy-3-mechacryloxypropoxy) benzophenone, 2-hydroxy-4-methoxy-5-sulfobenzophenone, 2-hydroxy-4-methoxy-5-sulfobenzophenone trihydrate, 2-hydroxy-4-methoxy-2'-carboxybenzophenone, 2-hydroxy-4-octadecyloxybenzophenone, 2-hydroxy-4-diethylamino-2'-hexyloxycarbonylbenzophenone, 2,2'-dihydroxy-4-methoxybenzophenone, 2,2',4,4'-tetrahydroxybenzophenone, 2,2'-dihydroxy-4,4'-dimethoxybenzophenone, and 1,4-bis(4-benzyloxy-3-hydroxyphenoxy)butane. These benzophenone ultraviolet absorbers may be used singly or in a combination of two or more.

The content of the ultraviolet absorber in the surface protective layer is preferably not less than 0.1 parts by mass, more preferably not less than 0.5 parts by mass, and even more preferably not less than 1 part by mass based on 100 parts by mass of the resin constituting the surface protective layer. The content of the ultraviolet absorber in the surface protective layer is preferably not more than 10 parts by mass, more preferably not more than 8 parts by mass, and even more preferably not more than 5 parts by mass based on 100 parts by mass of the resin constituting the surface protective layer. The use of the ultraviolet absorber in an amount within the above range can achieve superior weatherability without bleeding of the ultraviolet absorber and can prevent yellowing of the surface protective layer.

Besides the ultraviolet absorber, the surface protective layer may optionally contain other additive(s). Examples of such additives include a light stabilizer, an abrasion-resistance enhancer, a polymerization accelerator, a polymerization inhibitor, a crosslinking agent, an infrared absorber, an antistatic agent, an adhesion improver, a levelling agent, a thixotropy-imparting agent, a coupling agent, a plasticizer, a defoamer, a solvent, and a colorant. The use of a weathering stabilizer such as a light stabilizer is preferred to achieve superior weatherability. The above additives may be used singly or in a combination of two or more.

From the viewpoint of enhancing the weatherability, and also enhancing the processing characteristics and the scratch resistance, the thickness of the surface protective layer is preferably not less than 1.5 μm, more preferably not less than 2 μm, and even more preferably not less than 3 μm. The thickness of the surface protective layer is preferably not more than 20 μm, more preferably not more than 15 μm, and even more preferably not more than 10 μm.

[Backing Substrate]

Figure 2:
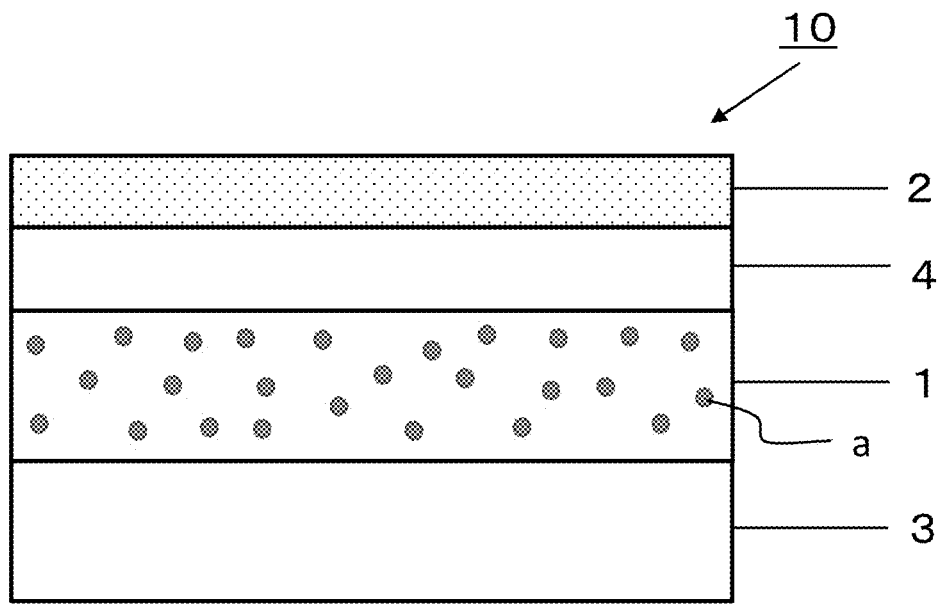
FIG. 2 is a schematic cross-sectional view illustrating another embodiment of a decorative sheet according to the present invention.

As shown in FIG. 2, the decorative sheet of the present invention can include a backing substrate 3, the substrate 1, and the surface protective layer 2, disposed in this order. The backing substrate can be optionally provided, for example, to reinforce the decorative sheet, to enhance adhesion to an adherent, and/or to impart masking properties to the decorative sheet, and is suitable especially when the above-described substrate is a coated film.

A resin sheet, paper, a non-woven fabric, a woven fabric, a metal foil, or the like can be used as the backing substrate. An acrylic resin, a polyester resin, a polyolefin resin, an ABS resin, or the like can be used as the resin sheet.

While the thickness of the backing substrate may be appropriately determined depending on the purpose, it is preferably 10 to 500 μm, more preferably 15 to 200 μm, and even more preferably 20 to 100 μm,

[Decorative Layer]

From the viewpoint of enhancing the design, the decorative sheet of the present invention may include a decorative layer 4 between the substrate 1 and the surface protective layer 2, as shown in FIG. 2.

The decorative layer may be, for example, a colored layer formed by coating the entire surface (so-called solid colored layer), or a picture layer formed by printing a pattern by using an ink(s) and a printer, or may be a combination thereof. For example, when it is intended to mask the color of an adherend, the use of a solid colored layer can enhance the design while coloring and masking the adherend. From the viewpoint of further enhancing the design, it is possible to use a combination of a solid colored layer and a picture layer. On the other hand, when it is intended to make use of the design or pattern of an adherend, only a picture layer may be provided.

A mixture of a binder with an additive(s), such as a colorant, e.g. a pigment or a dye, an extender pigment, a solvent, a stabilizer, a plasticizer, a catalyst, a curing agent, an ultraviolet absorber, a light stabilizer, etc., can be used as an ink for the decorative layer.

There is no particular limitation on the binder. Examples of usable binders include a polyurethane resin, a vinyl chloride-vinyl acetate copolymer resin, a vinyl chloride-vinyl acetate-acrylate copolymer resin, a chlorinated propylene resin, an acrylic resin, a polyester resin, a polyamide resin, a butyral resin, a polystyrene resin, a nitrocellulose resin, and a cellulose acetate resin. These resins may be used singly or as a mixture of two or more. Among them, a polyurethane resin is especially preferred.

Examples of usable colorants include an inorganic pigment such as carbon black, iron black, titanium white, antimony white, chrome yellow, titanium yellow, red iron oxide, cadmium red, ultramarine blue, or cobalt blue; an organic pigment or dye such as quinacridone red, isoindolinone yellow, or phthalocyanine blue; a metal pigment such as scaly foil pieces of aluminum, brass, or the like; and an pearlescent (pearl) pigment such as scaly foil pieces of titanium dioxide-coated mica, basic lead carbonate, or the like. When titanium white is used as the colorant, it is preferred to use the same white pigment particles as used in the substrate from the viewpoint of dispersion and weatherability.

While the thickness of the decorative layer may be appropriately selected depending on the intended picture, it is preferably 0.5 to 20 µm, more preferably 1 to 10 µm, and even more preferably 2 to 5 µm from the viewpoint of masking the color of an adherend and enhancing the design.

[Adhesive Layer]

The decorative sheet of the present invention may include an adhesive layer. Especially when the decorative layer is provided between the substrate and the surface protective layer, an adhesive layer is preferably provided for adhesion of the decorative sheet to the surface protective layer. There is no particular limitation on the adhesive constituting the adhesive layer. Examples thereof include an urethan resin adhesive, a vinyl resin adhesive, an acrylic resin adhesive, a polyester resin adhesive, and a cellulose resin adhesive.

From the viewpoint of obtaining a sufficient adhesiveness, the thickness of the adhesive layer is preferably 0.1 to 30 µm, more preferably 1 to 15 µm, and even preferably 2 to 10 µm.

[Transparent Resin Layer]

The decorative sheet of the present invention may include a transparent resin layer. Especially from the viewpoint of protecting the decorative layer, the transparent resin layer can be provided on the decorative layer either directly or via another layer such as an adhesive layer.

Examples of preferable resins for the transparent resin layer include a polyolefin resin, a polyester resin, an acrylic resin, a polycarbonate resin, a polyurethane resin, a polystyrene resin, a vinyl chloride resin, and a vinyl acetate resin. Among them, from the viewpoint of enhancing the weatherability and the surface properties such as scratch resistance, a polyolefin resin and a polyester resin are preferred, and a polyolefin resin is more preferred. The polyolefin resin can be exemplified by the resins described above as being usable for the resin substrate. Among them, a polypropylene resin is most preferred.

The transparent resin layer may optionally contain an additive. The additive can be exemplified by the additives described above as being usable for the substrate. Among such additives, a weathering stabilizer such as an ultraviolet absorber or a light stabilizer is preferably used. There is no particular limitation on the amount of the additive, and it may be appropriately set depending on the required properties, etc.

The thickness of the transparent resin layer is preferably 10 to 150 µm, more preferably 30 to 120 µm, and even more preferably 50 to 100 µm from the viewpoint of protection of the decorative layer and handling of the decorative sheet.

One or both surfaces of the transparent resin layer may be subjected to a physical or chemical surface treatment, e.g. by an oxidation method or a surface roughening method, for example to enhance the interlayer adhesion between the transparent resin layer and another layer(s). The surface treatment method may be appropriately selected depending on the type of the resin to be treated; however, in general, a corona discharge treatment method is preferably used from the viewpoint of the effect, the operability, etc.

Further, in order to enhance the interlayer adhesion between the transparent resin layer and another layer(s), one or both surfaces of the transparent resin layer may be subjected to processing e.g. to form a primer layer.

[Primer Layer]

The decorative sheet of the present invention may include a primer layer. When the primer layer is provided, it is preferably disposed between the decorative layer and the surface protective layer. The provision of the primer layer can enhance the adhesion between the decorative layer and the surface protective layer and, in addition, can relax stress in the surface protective layer. This makes it possible to prevent cracking of the surface protective layer due to deterioration of the weatherability of the layer, and to significantly enhance the durability.

A resin for the primer layer can be exemplified by the resins described above as binders usable for the decorative layer. Such resins can be used singly or in a combination of two or more. For example, an acrylic-urethane resin or a mixture of a polycarbonate urethane-acrylate copolymer and an acrylic polyol resin can be used as the resin. The primer layer can be formed of a resin composition which is a mixture of the resin with an additive(s), such as a solvent, a stabilizer, a plasticizer, a catalyst, a curing agent, an ultraviolet absorber, a light stabilizer, etc.

From the viewpoint of enhancing the adhesiveness, the thickness of the primer layer is preferably 0.1 to 10 µm, more preferably 0.5 to 8 µm, and even more preferably 1 to 6 µm.

[Decorative Sheet Production Method]

The decorative sheet production method of the present invention will now be described with reference to a decorative sheet which includes a substrate, a decorative layer, an adhesive layer, a transparent resin layer, a primer layer, and a surface protective layer in this order according to a preferred embodiment of the present invention.

The decorative sheet of the present invention can be produced, for example, through the sequential steps of: forming a decorative layer on a substrate; forming an adhesive layer, a transparent resin layer and a primer layer on the decorative layer; and applying a curable resin composition onto the primer layer, followed by curing to form a surface protective layer.

The step of forming the decorative layer on the substrate is performed by applying an ink(s), to be used for the formation of the decorative layer, onto the substrate containing the white pigment particles, thereby forming the intended colored layer and/or the intended picture layer. The application of the ink(s) is performed by a known method such as a gravure printing method, a bar coating method, a roll coating method, a reverse roll coating method, or a comma coating method, preferably by a gravure printing method.

In the step of forming the adhesive layer, the transparent resin layer and the primer layer on the decorative layer, an adhesive is first applied onto the decorative layer on the substrate to form the adhesive layer. Subsequently, using a resin composition which is to constitute the transparent resin layer, the transparent resin layer is pressed against and adhered to the adhesive layer by a method such as extrusion lamination, dry lamination, wet lamination, or thermal lamination, thereby laminating the transparent resin layer to the adhesive layer. Thereafter, a resin composition, which is to constitute the primer layer, is applied onto the transparent resin layer by a known method such as such as a gravure printing method, a bar coating method, a roll coating method, a reverse roll coating method, or a comma coating method, thereby forming the primer layer.

The step of forming the surface protective layer is performed by applying a curable resin composition containing an ultraviolet absorber onto the primer layer, and then curing the resin composition.

The application of the resin composition is preferably performed by a known method such as gravure coating, bar coating, roll coating, reverse roll coating, or comma coating, more preferably by gravure coating in such a manner that the surface protective layer after curing has a predetermined thickness.

When an ionizing radiation-curable resin composition is used for the formation of the surface protective layer, an uncured resin layer, formed by coating of the resin composition, becomes the surface protective layer by irradiating the uncured resin with ionizing radiation, such as an electron beam or ultraviolet light, to cure the resin layer. When an electron beam is used as the ionizing radiation, the acceleration voltage may be appropriately selected depending on the type of the resin used and the thickness of the layer. However, it is generally preferred to cure the uncured resin layer at an acceleration voltage of about 70 to 300 kV.

The exposure dose is preferably at a level at which the crosslinking density of the ionizing radiation-curable resin becomes saturated, and is generally selected within the range of 5 to 300 kGy (0.5 to 30 Mrad), preferably within the range of 10 to 50 kGy (1 to 5 Mrad).

There is no particular limitation on the electron beam source; various electron beam accelerators, such as a Cockloft-Walton type, a van de Graaff type, a resonance transformer type, an insulated core transformer type, a linear type, a Dynamitron type, and a high-frequency type, can be used.

<Decorative Material>

The decorative material of the present invention includes an adherend and the above-described decorative sheet. More specifically, the decorative material of the present invention is a laminate of the adherend and the decorative sheet, in which the adherend faces the substrate-side surface of the decorative sheet.

[Adherend]

The adherend can be exemplified by plates, such as flat plates or curved plates, made of a variety of materials, an article having a three-dimensional shape, and a sheet (or a film). Specific examples thereof may include a wood member for use as an article having a three-dimensional shape or as a plate material such as a single wood plate, a plywood plate, a particle board or a wood fiberboard, e.g. an MDF (medium-density fiberboard), made of a variety of woods such as Japanese cedar, Japanese cypress, pine, and lauan; a metal member for use as a plate material of iron or an iron alloy such as carbon steel, aluminum or an aluminum alloy such as duralumin, copper or a copper alloy such as brass, titanium, etc., an article having a three-dimensional shape, or a sheet; a ceramic member for use as a plate member or an article having a three-dimensional shape, made of glass, ceramics such as pottery, a non-cement ceramic material such as gypsum, or a non-pottery ceramic material such as ALC (autoclaved lightweight concrete); and a resin member for use as a plate material, an articles having a three-dimensional shape or a sheet, e.g. made of an acrylic resin, a polyester resin, a polystyrene resin, a polyolefin resin such as polypropylene, an ABS (acrylonitrile-butadiene-styrene copolymer) resin, a phenol resin, a vinyl chloride resin, a cellulose resin, or a rubber. These members can be used singly or in a combination of two or more.

The adherend may be appropriately selected from the above members depending on the intended use. When the decorative material is used for an interior material of an architectural structure such as a wall, a ceiling, or a floor, or for fittings or a fixture member such as a window frame, a door, a handrail, a skirting board, a crown molding, or a cable cover, the adherend is preferably including at least one member selected from a wood member, a metal member, and a resin member. When the decorative material is used for an exterior member such as a front door, a gate, a roofing material, a railing, or a fence, or for fittings such as a window frame or a door, the adherend is preferably including at least one member selected from a metal member and a resin member.

While the thickness of the adherend may be appropriately selected depending on the intended use and the material, it is preferably not less than 0.1 mm and not more than 10 mm, more preferably not less than 0.3 mm and not more than 5 mm, and even more preferably not less than 0.5 mm and not more than 3 mm.

[Adhesive Layer]

In order to obtain excellent adhesion between the adherend and the decorative sheet, they are preferably attached to each other via an adhesive layer. Thus, the decorative material of the present invention preferably is a member including at least the adherend, the adhesive layer, the substrate, and the surface protective layer in this order.

There is no particular limitation on an adhesive to be used for the adhesive layer, and known adhesives can be used. For example, a heat-sensitive adhesive or a pressure-sensitive adhesive can be preferably used. Examples of resins which are usable for the adhesive constituting the adhesive layer include an acrylic resin, a polyurethane resin, a vinyl chloride resin, a vinyl acetate resin, a vinyl chloride-vinyl acetate copolymer resin, a styrene-acrylate copolymer resin, a polyester resin, and a polyamide resin. These resins can be used singly or in a combination of two or more. A two-component curable polyurethane or polyester adhesive, using a curing agent such as an isocyanate compound, can also be used.

A gluing agent may also be used for the adhesive layer. An acrylic, urethane, silicone or rubber gluing agent can be appropriately selected and used.

The adhesive layer can be formed by applying and drying the above resin in an applicable form, such as a solution or an emulsion, by a method such as a gravure printing method, a screen printing method, or a reverse coating method using a gravure plate.

While there is no particular limitation on the thickness of the adhesive layer, it is preferably not less than 1 μm and not more than 100 μm, more preferably not less than 5 μm and not more than 50 μm, and even more preferably not less than 10 μm and not more than 30 μm from the viewpoint of obtaining excellent adhesiveness.

[Decorative Material Production Method]

The decorative material can be produced through a process of laminating the decorative sheet and an adherend together.

The process involves laminating an adherend and the decorative sheet of the present invention, with the surface of the adherend that requires decoration facing the substrate-side surface of the decorative sheet. The process can be preferably performed, for example, by the following methods: a lamination method which involves pressing the decorative sheet against a plate-like adherend via an adhesive by using a pressure roller; a wrapping method which involves pressing the decorative sheet against a plurality of side surfaces, constituting an adherend, via an adhesive sequentially by using a plurality of rollers in different directions while supplying the decorative sheet; and a vacuum forming method which involves heating the decorative sheet, fixed in a fixing frame, with a heater via a silicone rubber sheet to a predetermined temperature at which the decorative sheet softens, and pressing a vacuum forming mold against the heated and softened decorative sheet while sucking air from the vacuum forming mold e.g. with a vacuum pump, thereby bringing the decorative sheet into tight contact with the vacuum forming mold.

When a hot-melt adhesive (heat-sensitive adhesive) is used in the lamination method or the wrapping method, the heating temperature is preferably not less than 160° C. and not more than 200° C., though it may vary depending on the type of the resin constituting the adhesive. In the case of using a reactive hot-melt adhesive, the heating temperature is preferably not less than 100° C. and not more than 130° C. When the lamination process is performed by the vacuum forming method, the process is generally carried out while heating the decorative sheet and the adherend preferably at a temperature of not less than 80° C. and not more than 130° C., more preferably at a temperature of not less than 90° C. and not more than 120° C.

<Application>

The thus-obtained decorative material may be arbitrarily cut, and the front or end surface(s) may be subjected to decoration processing, such as grooving or chamfering, by using a cutting machine such as a router or a cutter. Further, after attaching the decorative sheet to a steel plate or the like, the decorative material may be subjected to bending such as V-cutting or wrapping. The decorative material finds a variety of applications including: an interior material or an exterior member of an architectural structure such as a wall, a ceiling, a floor, or a front door; fittings or a fixture member such as a window frame, a door, a handrail, a skirting board, a crown molding, or a cable cover; a surface decorative plate for a kitchen or furniture or for a cabinet of a light electrical appliance, an OA instrument, etc.; and an interior material or an exterior member of a vehicle.

EXAMPLES

The following examples illustrate the present invention in greater detail and are not intended to limit the scope of the invention.

(Evaluation and Measurement Method)

(1) Evaluation of Weatherability

For the decorative sheets obtained in Examples and Comparative Examples, a weather resistance test was performed with a sunshine weatherometer ("WEL-300", manufactured by Suga Test Instruments Co., Ltd.) by allowing each decorative sheet to stand for 6,000 hours under the conditions of 18-minute rainfall per 120 minutes at a black panel temperature of 63° C. The appearance of each decorative material after the weather resistance test was visually observed, and evaluated by the following criteria:

A: no significant change in appearance was observed

B: a small crack was observed in the substrate

C: a large crack in the substrate and/or an abnormality, such as delamination or floating, between the substrate and the surface protective layer was observed (2) Evaluation of Dispersion Cross-sections of the decorative sheets obtained in Examples and Comparative Examples in the thickness direction were observed with a scanning electron microscope (SEM). Dispersion of white pigment particles in the substrate was visually observed, and evaluated by the following criteria:

A: uniform dispersion of white pigment particles was observed

C: non-uniform dispersion of white pigment particles as well as partial agglomeration of the particles were observed Example 1

A 60 μm thick polypropylene sheet containing white pigment particles, which were titanium oxide particles having a coating containing Al element and Si element, and bis(1-undecanoxy-2,2,6,6-tetramethyl piperidine-4-yl) carbonate as a hindered amine light stabilizer in an amount of 3 parts by mass based on 100 parts by mass of the resin was used as a substrate. The Ti:Al:Si mass ratio in the white pigment particles was 1:0.05:0.003, the content of the white pigment particles in the substrate was 10% by mass, and the average particle diameter of the primary particles of the white pigment particles was 0.26 μm.

After performing a corona discharge treatment on both surfaces of the substrate, gravure printing was performed on one surface of the substrate using a printing ink containing an acrylic-urethane resin, thereby forming a decorative layer.

Subsequently, a urethane resin adhesive was applied onto the decorative layer such that the thickness of the adhesive after drying became 3 μm, thereby forming a transparent adhesive layer.

Subsequently, a polypropylene resin was melt-extruded by a T-die extruder onto the adhesive layer to form a transparent resin layer of polypropylene having a thickness of 80 μm.

After performing a corona discharge treatment on the surface of the transparent resin layer, a coating solution containing a resin composition having a resin component containing a polycarbonate urethane-acrylate copolymer and an acrylic polyol was applied to the surface of the transparent resin layer in an amount of 4 g/m$^2$ to form a primer layer having a thickness of about 4 μm.

Lastly, an ionizing radiation-curable resin composition, containing 100 parts by mass of a trifunctional urethane acrylate oligomer having a weight-average molecular weight of about 5000, and 4 parts by mass of 2-(2-hydroxy-4-[1-octyloxycarbonylethoxy]phenyl)-4,6-bis(4-phenylphenyl)-1,3,5-triazine as a triazine ultraviolet absorber, was applied onto the primer layer by a gravure coating method to form a coating. Thereafter, the coating was irradiated with an electron beam under the conditions of 175 keV and 5 Mrad (50 kGy) to crosslink and cure the coating, thereby forming a surface protective layer (5 g/m$^2$) having a thickness of 5 μm and obtaining a decorative sheet.

The above evaluations were performed on the decorative sheet obtained. The evaluation results are shown in Table 1 below.

Examples 2 and 3, and Comparative Examples 1 and 2

A decorative sheet was produced in the same manner as in Example 1 except for using, instead of the white pigment particles used in Example 1, white pigment particles which were coated titanium oxide particles having a Ti:Al:Si mass ratio shown in Table 1. The above evaluations were performed on the decorative sheet obtained. The evaluation results are shown in Table 1 below.

TABLE 1

| | White pigment particles Ti:Al:Si mass ratio (Ti = 1) | | Evaluation | |
|---|---|---|---|---|
| | Al | Si | Weatherability | Dispersion |
| Example 1 | 0.05 | 0.003 | B | A |
| Example 2 | 0.06 | 0.006 | A | A |
| Example 3 | 0.10 | 0.040 | B | A |
| Comparative Example 1 | 0.04 | 0.002 | C | A |
| Comparative Example 2 | 0.20 | 0.070 | B | C |

INDUSTRIAL APPLICABILITY

The decorative sheet and the decorative material of the present invention have excellent weatherability, and are therefore especially useful as an exterior decorative material.

REFERENCE SIGNS LIST

10 decorative sheet
1 substrate
2 surface protective layer
3 backing substrate
4 decorative layer
a white pigment particles

The invention claimed is:

1. A decorative sheet comprising at least a substrate and a surface protective layer, wherein the surface protective layer contains an ultraviolet absorber, and the substrate contains white pigment particles, and wherein the white pigment particles are titanium oxide particles having a coating containing Al element and Si element and formed on part or the whole of their surfaces, and contain Ti, Al and Si elements in the following mass ratio: when Ti is taken as 1, Al is not less than 0.02 and less than 0.20, and Si is more than 0.002 and not more than 0.070.

2. The decorative sheet according to claim 1, wherein the substrate further contains a hindered amine light stabilizer.

3. The decorative sheet according to claim 1, wherein the ultraviolet absorber is a triazine ultraviolet absorber.

4. The decorative sheet according to claim 1, wherein the surface protective layer contains a cured product of an ionizing radiation-curable resin composition.

5. The decorative sheet according to claim 1, wherein the value [(a×b)/100], obtained by dividing by 100 the product of the content a [% by mass] of the white pigment particles in the substrate and the thickness b [μm] of the substrate, is not less than 0.1 and not more than 20.

6. The decorative sheet according to claim 1, further comprising a backing substrate, wherein the backing substrate, the substrate and the surface protective layer are disposed in this order.

7. The decorative sheet according to claim 1, further comprising a decorative layer between the substrate and the surface protective layer.

8. A decorative material comprising an adherend and the decorative sheet according to claim 1.

* * * * *